July 9, 1974  F. H. GEURTSEN ET AL  3,823,218
METHOD OF MOLDING A TURRET
Filed Sept. 11, 1969  2 Sheets-Sheet 1

INVENTORS
FRIEDRICH H. GEURTSEN
FRED J. WOCHNER
BY
*Llike, Thompson & Bronstein*
ATTORNEYS July 9, 1974   F. H. GEURTSEN ET AL   3,823,218
METHOD OF MOLDING A TURRET
Filed Sept. 11, 1969   2 Sheets-Sheet 2
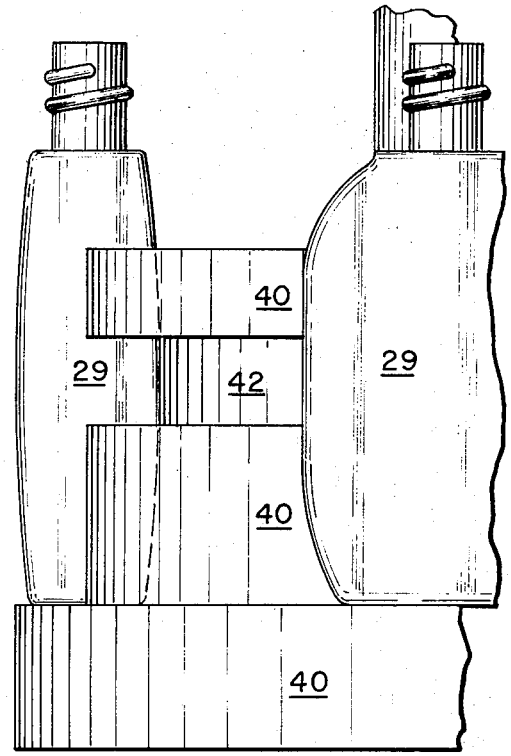
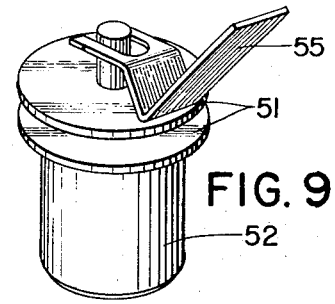
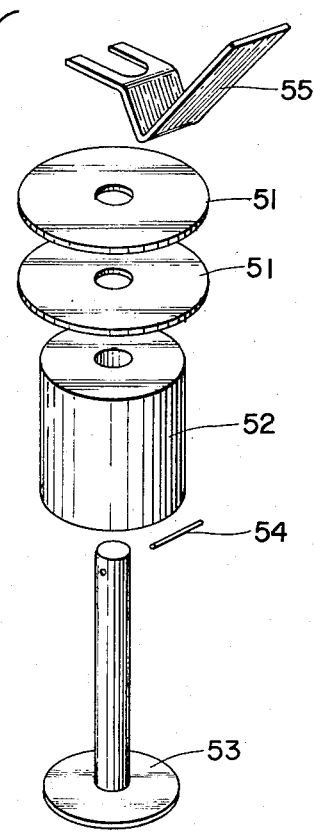
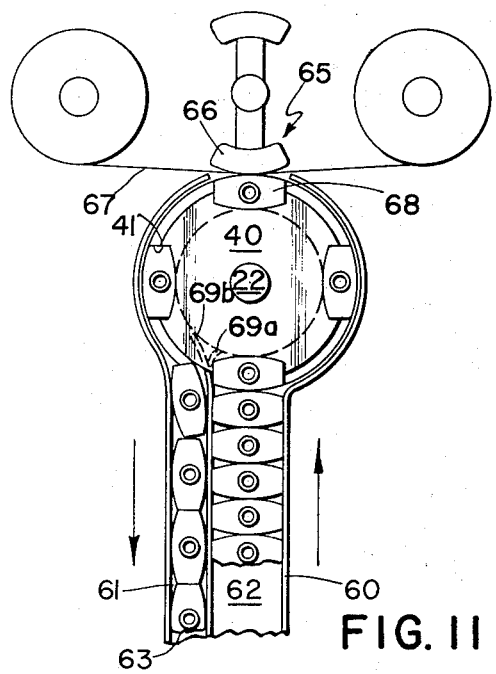
INVENTORS
FRIEDRICH H. GEURTSEN
FRED J. WOCHNER
BY
*Dike, Thompson & Bronstein*
ATTORNEYS

United States Patent Office 3,823,218
Patented July 9, 1974

3,823,218
METHOD OF MOLDING A TURRET
Friedrich H. Geurtsen and Fred J. Wochner, Holliston, Mass., assignors to Dennison Manufacturing Company, Framingham, Mass.
Filed Sept. 11, 1969, Ser. No. 856,946
Int. Cl. B29h 21/08
U.S. Cl. 264—162                                        9 Claims

ABSTRACT OF THE DISCLOSURE

A molded turret for carrying containers from and to a transport means (belt) to a labeling station wherein the label is transferred to the containers which are positioned in the turret.

Figure 1:
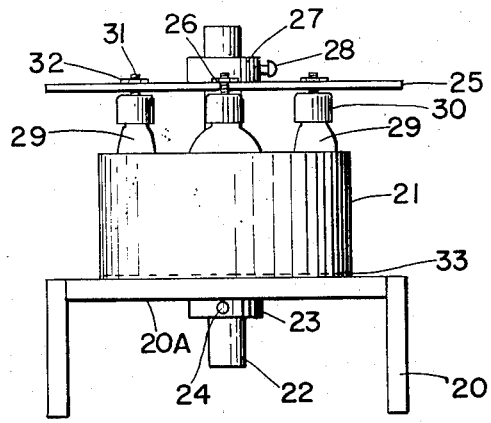

The turret is molded from plastic such that portions of the turret have the configuration of a portion of the container to be carried thereby. The turret is fabricated by positioning at least a portion of the containers within a mold and then pouring a settable plastic into the mold. Thereafter the excess plastic from the molded article is cut away and the containers are removed to provide the molded turret.

---

This invention is directed to a turret suitable for use in a container or bottle decorating system and is more particularly related to a molded turret and method of making said molded turret.

Over the years the assignee of this invention has developed a system for decorating containers with printed labels. The labels are applied from a web supporting the same and are transferred by applying pressure against the web to apply the label to the container from the web as the web passes in proximity to the container.

This type of system is shown in U.S. Pats. 3,064,714 and 3,079,979, both issued to C. A. Flood and assigned to the assignee of this invention.

As will be seen from Pat. 3,064,714, the containers are presented at the decorating station, by a combination of conveyor belts and a machined metal turret. The turret includes machined lower and upper metal plates cut out in the configuration of the container and there is further provided support means to hold the bottom of the container in order to position it in the turret (see FIGS. 1 and 5 of Pat. 3,064,714).

Although, the turrets shown in the above-mentioned patents are quite acceptable, they are quite expensive and time consuming to machine. Depending on the shape of the container (i.e. round, oval, tapered, concave and recessed, or flat side), the cost of a machined turret can vary between one and two thousand dollars and take between a few days to weeks to construct. Since a different turret must be used for every different bottle or container shape, the expense of machined turrets does not economically permit the use of the above-mentioned decorating schemes for small runs of containers and thus the decorating system has been generally limited to use in mass production facilities.

In addition, because of the accuracy of the machining required to fabricate the turret, supply of turrets has had to come from the factory and could not be easily fabricated on site by the user.

In view of the above, a new and improved turret was required not only to reduce costs but also to make it economically feasible for the decorating scheme of the assignee to be more fully utilized by small packagers. In addition, this invention provides for the first time, at the option of the packager the possibility of fabricating turrets for its own use when changes are made in bottle shapes.

In accordance with this invention, the above requirements have been met by providing a molded turret having a plurality of container retaining recesses formed in the outside surface thereof.

In addition, turret construction costs have been significantly reduced such that they are now in the order of one-quarter to one-half the cost of making a comparable machined turret. This has been made possible by using the container themselves as the means for forming the recess in the molded turret.

Accordingly, it is an object of this invention to provide a new and improved turret.

It is a further object of this invention to provide a molded turret which is relatively inexpensive to construct and requires significantly less time to fabricate then prior art turrets. A further object of this invention is to provide a new and improved method of moulding a turret suitable for positioning a container at a decorating station.

Figure 2:
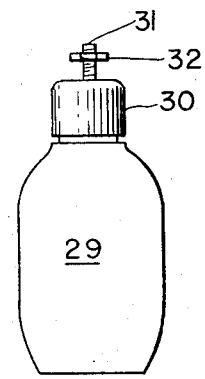
Figure 5:
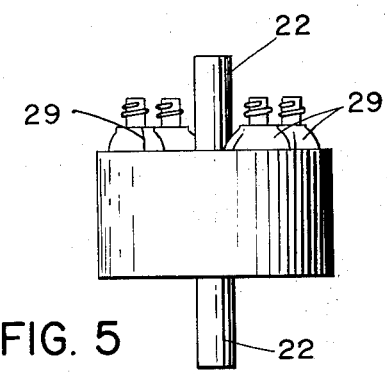
Figure 3:
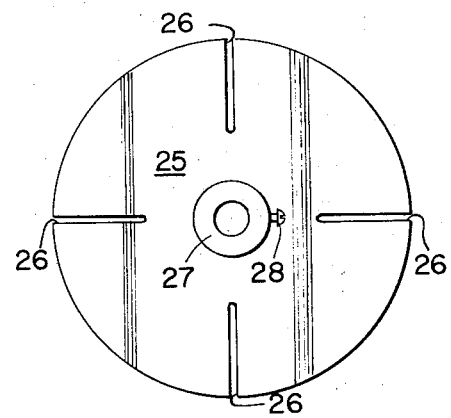
Figure 6:
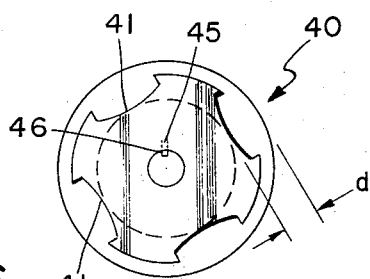
Figure 4:
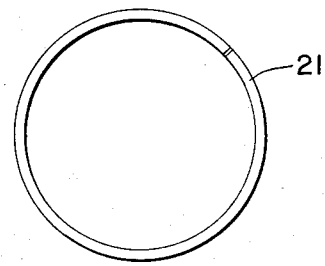
Figure 7:
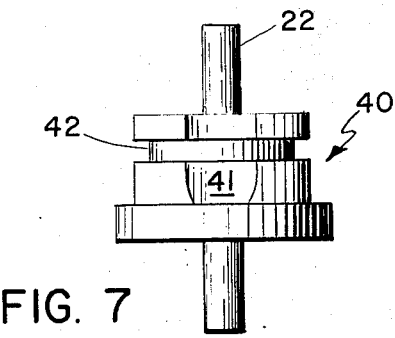

Other objects and advantages of the invention will be apparent to those skilled in the art from the following detailed description of the drawings in which:

FIG. 1 is a side elevation showing the fixture and scheme for molding the turret according to the inventions, FIG. 2 is a side view of the container and means for supporting the container on the molding fixture, FIG. 3 is a top view of the container locating plate of the molding fixture, FIG. 4 is a top view of the molding fixture outside the retaining wall, FIG. 5 is a side elevation view of the turret after removal from the molding fixture, FIG. 6 is a top view of the molded turret, FIG. 7 is a side view of the molded turret, FIG. 8 is broken off side view of the turret, with bottles shown being carried by the turret, FIG. 9 is a view of an alternate form of a device for positioning the containers on the locating plate, FIG. 10 is a view showing the various parts of the device of FIG. 9, and FIG. 11 diagrammatically shows the molded turret of this invention in a labeling machine.

Reference should now be made to FIGS. 1–7 for a description of the molded turret and the method of making the same.

FIG. 1 shows a jig 20 of wood, metal, plastic or any other suitable material for supporting a cylindrical ring or member 21 thereon. The ring may be welded as shown, or fastened together in any conventional manner or may be held together with a strap and locking arrangement. The ring may be metal, plastic or any other suitable material.

A shaft 22 is positioned through a hole (not shown) cut out from the jig. The shaft 22 is preferable the shaft ultimately used to position and rotate the turret when the turret is used in a decorating machine. If desired, a slot (not shown) may be cut in the top portion 20A of the jig to position the shaft. About the hole for the shaft there is provided a collar block 23, attached to the underside of portion 20A and having a bolt 24 for retaining the shaft 22 in position. If a slot is provided in portion 20A, the collar 23 is constructed such that it only surrounds a portion of the shaft 22. The shaft 22 is preferably provided with a keyway or flat so that the bolt 24 can retain it in place and prevent the shaft from rotating. Positioned on the top part of the shaft is a positioning plate 25 having a plurality of positioning slots 26 cut out therefrom. The number of slots, and the position will depend on the number of container carrying recesses to be formed in the molded turret. The plate 25 is provided with a collar 27 attached thereto and a set screw 28. In this manner the plate 25 is positioned as shown in FIG. 1.

In order to form the bottle or container supporting recesses in the molded turrets, extra ones of the containers, to be labeled, are used as the molding models. The containers are shown at 29 and are preferably of the usual plastic type commonly used in packaging.

The bottles 29 are supported by the plate 25 by the provision of the usual bottle cap or top 30 through which a bolt or screw 31 is passed from the inside of the cap. A nut 32 is provided so that the bottles 29 can be supported by the plate 25 in the slots 26 thereof as shown in FIG. 1.

After the fixture is set up as shown in FIG. 1, a sheet of material 33 such as metal (i.e. aluminum foil) or plastic (i.e. polyethylene) is provided as the bottom for the mold 21. The material is preferably inserted within the bottom confines of the mold 21 and shaped to act as the bottom portion of the mold 21. The material 33 can also be used as a flat sheet such that it extends beyond the confines of the cyclindric mold 21. Preferably, in this case, the material is wrapped about the outer bottom portion of the mold 21.

At this time, molding can now take place. Preferably before placing the molding composition into the mold, a molding release compound is used to coat the interior of the mold. Such molding release compounds are well known in the art and can be selected from among many silicone base release compounds presently being marketed.

The molding composition is now poured into the mold 21 about the container 29 and shaft 22. If desired the plate 25 can be provided with a plurality of openings or holes (not shown) for permitting the molding composition to be poured therethrough. As is well known in the art, there are many different types of molding materials possessing the properties requisite for this application. Among the molding compositions (i.e. plastics) useful in the molding of the turret of this invention are the epoxy or epoxide resins. Epoxy resins such as Diglycidyl ether of Bisphenol A (i.e. a resin portion based on epichlorohydrin/bisphenol A epoxy) and its homologs. (Glycidyl ethers of Bisphenol F and Long Chain Bisphenol, and Epoxylated Novalaks, are suitable for the purpose of this invention. In addition, the molding composition preferably includes a curing agent such as aliphatic polyamines, cyclic alphatic amines, tertiary alphatic amines, aromatic amines, and organic dibasic and polybasic acid anhydrides, all of which are commonly used in molding composition. The molding composition may also include diluents such as phenyl glycidyl ether, butyl glycidyl ether, allyl glycidyl ether and octylene oxide. In addition, filler materials such as metals (i.e. aluminum etc.) and plastics and other resins in chunk or particle form may be dispersed in the molding composition to enhance the machinability, toughness and hardness of the product made from the molding composition.

After the molding composition is poured into the mold, it is permitted to cure or harden. This can be accomplished rapidly by heating, as for example; by placing the apparatus shown in FIG. 1 in an oven. In the alternative, curing can be accomplished by permitting the molding composition to harden by standing over night.

After the molding composition has hardened, the hardened molding composition is removed by lifting it out of the mold 21. FIG. 5 shows the molding composition with the bottles 29 and the shaft 22 after removed from the mold. In order to finish the turret, the construction shown is placed in a turret lathe or other machine tool, and cut down by a tool until it is shaped as a turret 40 as shown in FIGS. 6 and 7. The containers 29 used as the molding elements are also physically removed after the turret is shaped to leave the exposed container recesses shown at 41, which are in the form of the containers to be carried by the turret, and which are positioned in and about the outer wall of the turret. As may be seen in FIG. 6, a key 45 is placed in the keyway provided in the shaft at 46, to insure that the shaft and the turret will rotate together.

Preferably as shown in FIGS. 6–8 there is provided a slot 42 in the turret 40. This is cut out, again by using a machine tool. The slot 42 is used in combination with a guide element, riding therein and shown in FIG. 11 to guide containers into the turret recesses 41. The turret recesses are preferably of a depth $d$ of about, or preferably slightly more than, one half the depth of the container to be carried therein. As will be seen, the recess also includes a bottom portion which provides means for supporting the bottom of the container to be carried therein. In addition, the recess 41 as shown in FIG. 7 is preferably cut out, such that the top of the container (generally a threaded portion) does not fit into the contour of the recess. This permits means to be inserted into the container to inflate it (assuming plastic bottles are used) during the decorating process.

Reference should now be had to FIGS. 9 and 10 which show an alternative means for supporting the container models 29 on the plate 25. The means comprises a holder 50 similar to a bottle stopper in operation. The holder 50 comprises two plates or washers 51, a rubber plug 52, a compression disk 53 having a handle pin 54, and a handle 55 which all fit together to provide the device shown. The washers 51 fit on both sides of the slot of the plate 25 as the holder 50 is inserted in the slot 26 of the plate 25.

In order to position the bottles on the plate 25, the plug 52 is inserted in the top of the bottle and the holder is positioned in the plate slot 26. The handle is then rotated downward to spread the plug in the bottle to retain it, and force the washers above the plate.

Referring now to FIG. 11, there is diagrammatically shown a decorating section using the turret 40 of this invention. The system includes chutes 60 and 61 for guiding containers to and away from the turret 40. Within the chutes are conveyor belts 62 and 63 for carrying the containers to and away from the turret 40. The decorating station is generally shown at 65 and includes a pressure applying means 66 which applies pressure to a web 67 carrying a label decal to be applied to a container 68 positioned at the decorating station.

As may be seen in FIG. 11 the chute walls also include guide members 69a and 69b cooperating with the slot 42 of the turret, to guide the containers or bottles into the recesses 41. Preferably the members 69a and 69b ride against the slot surface such that they are guided thereby, and are positioned to accurately place the containers 68 into the recesses 41.

With the method and molded turret provided herein, it should be clear that an economical and time saving method has been provided for fabricating turrets. It will also be seen, with the turret of this invention, it is now economically feasible to use the decorating system described for labeling small runs of packages.

It will thus be seen, that the objects set forth above, among those made apparent from the preceding description are efficiently attained and that certain changes may be made in the above constructions without departing from the spirit and scope of the invention.

It is intended that all matter contained in the above description and shown in the accompanying drawing shall be interpreted as illustrative and not in a limiting sense.

It should be also understood that the following claims are intended to cover all the generic and specific features of the invention herein described and all statements of the scope of the invention which as a matter of law which might be said to fall therebetween.

We claim:

1. The method of forming a molded turret adapted to transport a bottle in a recess formed therein, said recess having a back wall, side walls and a bottom to support a bottle therein comprising the steps of forming a turret mold, the turret mold having a bottom and an outer sidewall into which a molding composition may be placed, supporting a molding bottle of the same shape to be transported by the molded turret within said turret mold, said molding bottle being supported so that the bottom thereof is positioned above the bottom of the mold, filling the mold with an uncured molding composition such that the molding composition is positioned about and below the entire bottom and the entire lower portion of said bottle, curing the molding composition to harden it about the bottle, removing the cured molding composition from the mold, and machining away the cured molding composition and removing the bottle to leave the recess having a back wall, sidewalls and a bottom to support a bottle therein.

2. The method according to claim 1 including the steps of placing a shaft through said mold such that it extends below the mold bottom and above the mold outer sidewall prior to locating the bottle in the mold, locating a fixture on a portion of the shaft extending above the mold sidewall, then prior to filling the mold with molding composition coupling the bottle to the fixture so that a portion of the bottle extends downwardly into the mold but is positioned with its bottom above the mold bottom, and then filling the mold with the uncured molding composition so that the molding composition surrounds the shaft and a portion of the bottle.

3. The method of claim 2 including the step of coupling the bottle to the fixture by securely supporting a neck portion of the bottle with neck holder means and then attaching the neck holder means to the fixture.

4. The method of claim 3 in which the bottle is held within the cured molding composition during machining and is removed when sufficient material has been machined from the cured molding composition.

5. The method of claim 4 in which the bottle is of plastic material.

6. The method of claim 1 in which the bottle is held within the cured molding composition during machining and is removed when sufficient material has been machined from the cured molding composition.

7. The method according to claim 6 in which the bottle is plastic material.

8. The method of forming a molded turret adapted to transport a bottle in a recess formed therein, said recess having a back wall, sidewalls and a bottom to support a bottle therein, comprising the steps of forming a turret mold, the turret mold having a bottom and an outer wall into which a molding composition may be placed, placing a shaft through the mold bottom such that the shaft extends above the outer sidewall and below the mold bottom, attaching a fixture to the portion of the shaft extending above the outer sidewall, fixedly attaching a bottle to the fixture with a bottle neck holder means coupled to the neck of the bottle and to the fixture so that at least a portion of the bottle extends into the mold and so that the bottom of the bottle is positioned above the mold bottom, said bottle having the same shape of the bottle to be transported by the turret, filling at least a portion of the mold with uncured molding composition so that the molding composition surrounds the shaft and the lower portion of the bottle as well as the bottle bottom, curing the molding composition to harden it about the shaft and the bottle, removing the cured molding composition from the mold, and machining away the cured molding composition and removing the bottle to leave the recess having a back wall, sidewalls, and a bottom to support a bottle therein.

9. The method of claim 8 in which the bottle is of plastic material and is retained within the molding composition while the molding composition is being machined.

References Cited

UNITED STATES PATENTS

| | | | |
|---|---|---|---|
| 2,075,281 | 3/1937 | Hall | 264—331 X |
| 3,272,895 | 9/1966 | Rech | 264—162 X |
| 3,290,421 | 12/1966 | Miller, Jr. | 264—277 X |
| 3,328,502 | 6/1967 | Robson | 264—275 X |
| 3,374,538 | 3/1968 | Murray | 264—275 X |
| 3,403,883 | 10/1968 | Simko | 264—275 UX |
| 3,468,020 | 9/7969 | Carlson et al. | 264—272 X |
| 3,499,066 | 3/1970 | Murray | 264—277 X |
| 3,525,786 | 8/1970 | Meyn | 264—277 X |
| 3,525,149 | 8/1970 | Forste | 264—275 X |
| 3,529,054 | 9/1970 | Hepner | 264—277 X |
| 2,338,210 | 1/1944 | Snyder | 264—154 X |
| 3,557,274 | 1/1971 | Kowell | 264—275 |

ROBERT F. WHITE, Primary Examiner

T. E. BALHOFF, Assistant Examiner

U.S. Cl. X.R.

264—275